United States Patent [19]

Nishimura

[11] Patent Number: 4,638,897
[45] Date of Patent: Jan. 27, 1987

[54] DAMPER DEVICE FOR A TORQUE CONVERTER CLUTCH

[75] Inventor: Sadanori Nishimura, Saitama, Japan

[73] Assignee: Honda Giken Kogyo Kabushiki Kaisha, Tokyo, Japan

[21] Appl. No.: 505,753

[22] Filed: Jun. 20, 1983

[30] Foreign Application Priority Data

Jun. 24, 1982 [JP] Japan .............................. 57-107675
Jul. 24, 1982 [JP] Japan .......................... 57-111613[U]
Nov. 22, 1982 [JP] Japan .......................... 57-175612[U]

[51] Int. Cl.⁴ ...................... F16D 33/00; F16D 35/00
[52] U.S. Cl. ................................... 192/3.3; 192/3.31
[58] Field of Search .................. 192/3.33, 3.32, 3.31, 192/3.3, 3.29, 3.28; 74/731, 732

[56] References Cited

U.S. PATENT DOCUMENTS

| | | | |
|---|---|---|---|
| 3,035,455 | 5/1962 | Peras | 74/732 X |
| 3,252,352 | 5/1966 | General et al. | 74/DIG. 1 X |
| 3,730,315 | 5/1973 | Annis et al. | 192/3.3 |
| 3,977,502 | 8/1976 | Chana | 192/3.31 |
| 4,167,993 | 9/1979 | Vukovich et al. | 192/3.3 |
| 4,169,526 | 10/1979 | Malloy | 192/3.3 |
| 4,181,203 | 1/1980 | Malloy | 192/3.3 |
| 4,240,532 | 12/1980 | Blomquist | 192/106.2 X |
| 4,431,094 | 2/1984 | Parthuisot et al. | 192/3.31 X |

FOREIGN PATENT DOCUMENTS

| | | |
|---|---|---|
| 077125 | 4/1983 | European Pat. Off. . |
| 1179516 | 1/1970 | United Kingdom . |
| 1574669 | 9/1980 | United Kingdom . |
| 2076908 | 12/1981 | United Kingdom . |

Primary Examiner—Leslie A. Braun
Assistant Examiner—Dirk Wright
Attorney, Agent, or Firm—Lyon & Lyon

[57] ABSTRACT

A damper device for a torque converter clutch to allow slipping of the clutch under low torque transmitting conditions to absorb objectionable torque fluctuations. A fluid communication port in the clutch plate is exposed or covered to control the pressure differential across the clutch plate which operates the clutch. A valve member is connected to the turbine vane wheel on the output side of the torque converter to expose or cover the hole as the torque being transmitted is reduced or increased, respectively. In one form the valve member is mounted on the turbine vane wheel while in another form it is mounted on the clutch plate.

10 Claims, 14 Drawing Figures

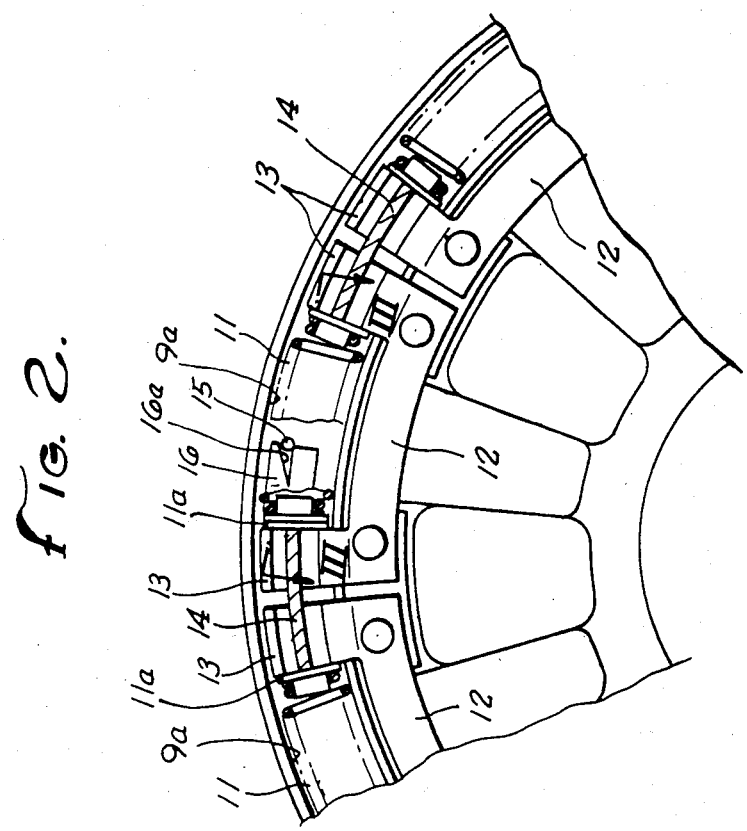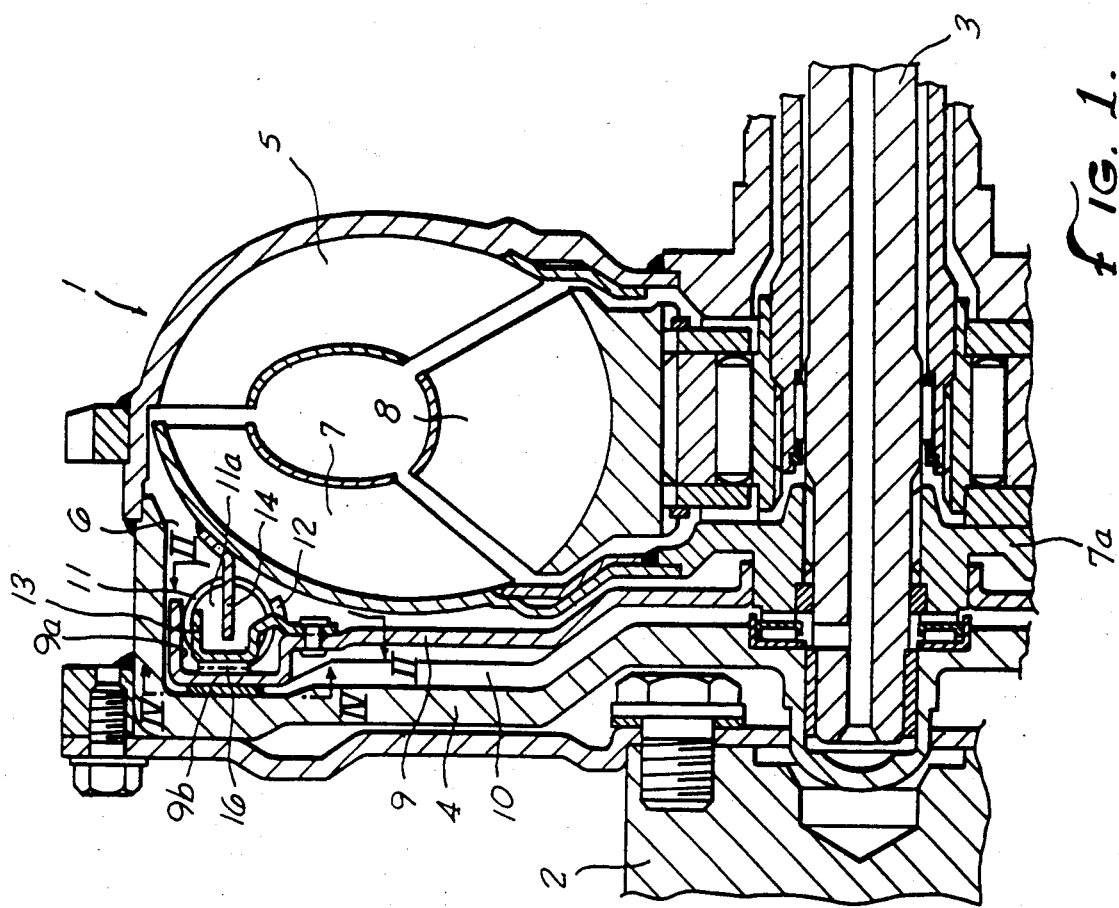

DAMPER DEVICE FOR A TORQUE CONVERTER CLUTCH

This invention relates to a damper device for a clutch in a torque converter primarily for use in a vehicle transmission.

The inclusion of a mechanical clutch in a fluid torque converter of a vehicle transmission for allowing slipping under certain conditions and direct coupling through the torque converter under other conditions is well known, such as from U.S. Pat. Nos. 3,252,352; 3,730,315 and 4,240,532. The first two patents disclose means for controlling the operation of the clutch in response to varying conditions and the third patent discloses springs for dampening the vibrations through the clutch. For example, in U.S. Pat. No. 4,240,532, the torque converter comprises an input case arranged on one side thereof and coupled to an input shaft which is in turn coupled to an engine, and a pump vane wheel coupled to the input case and arranged on the other side thereof, the input case and the pump vane wheel forming a main body of the torque converter defining an internal space therein. The internal space accommodates a turbine vane wheel coupled to an output shaft which is coupled to driving wheels of the vehicle, and an axially movable clutch plate arranged between the turbine vane wheel and the input case and cooperating with the input case to define a fluid chamber therebetween. With the discharge of fluid from the fluid chamber, the clutch plate, which is relatively rotatably connected to the turbine vane wheel through coil springs extending in the rotational or circumferential direction of the clutch plate, is urged into frictional engagement with the input case by an internal pressure in the internal space, whereby during high vehicle speed cruising torque is mechanically transmitted through the input shaft, the input case, the clutch plate, the coil springs, the turbine vane wheel and the output shaft in the order mentioned so as to prevent slipping within the torque converter and obtain efficient torque transmission. Further, fluctuations of the torque are absorbed by the resiliency of the coil springs so as to prevent them from being transmitted from the input shaft to the output shaft. However, this arrangement has the disadvantage that torque fluctuations cannot sufficiently be absorbed in an operating region where the driving torque of the engine is small.

More specifically, the coil springs must have a relatively high spring constant so as to absorb torque fluctuations in a high driving torque region and, therefore, it is difficult for the springs to sufficiently absorb torque fluctuations in a small or low driving-torque region due to insufficient resilient movement of the springs for the torque fluctuations generated in a low torque region.

The object of the invention is to provide a device which is capable of varying the internal pressure of the internal space in response to the magnitude of driving-torque so as to permit slipping of the clutch plate in a low driving-torque region, whereby torque fluctuations in the low torque region are efficiently absorbed by slipping of the clutch plate.

Another object of this invention is to provide a fluid flow control device in association with the clutch plate in the torque converter for automatically allowing fluid flow through the clutch plate at lower levels of torque transmission to reduce the clutch engaging pressure and allow slipping. A further object is to provide an improved form of a device that may be pre-set to control the fluid flow over different ranges of torque transmission rather than being directly dependent on the compression of the vibration dampening springs which is directly related to torque transmission.

Specific embodiments of the invention ar described with reference to the drawings, in which:

FIG. 1 is a cross-sectional side view of a torque converter showing a first embodiment of this invention.

FIG. 2 is a rear sectional view taken substantially on the line II—II in FIG. 1.

Figure 3:
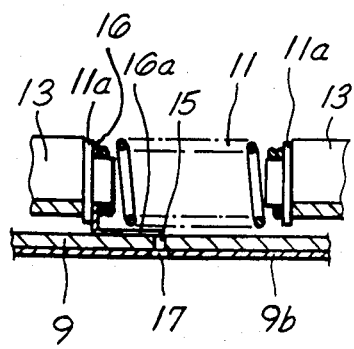
FIG. 3 is a top plan view taken substantially on the line III—III in FIG. 2.

In the drawings, reference numeral 1 designates the main body of a torque converter which is provided with an input shaft 2 on the front side thereof, connected to an engine, an output shaft 3 on the rear side, arranged coaxially with the input shaft 2 and connected to a load such as driving wheels of a vehicle, an input case 4 on the front side, connected to the input shaft 2, and a pump vane wheel 5 on the rear side, connected to the input case 4. A turbine vane wheel 7 is connected to the output shaft 3 via a radially inward hub 7a and arranged in an internal space 6 defined by the input case 4 and the pump vane wheel 5, and a stator vane wheel 8 is interposed between the vane wheels 5 and 7, whereby by the rotation of the input shaft 2, the internal fluid is circulated through these vane wheels 5, 7 and 8 to fluidly transmit torque to the output shaft 3 through the turbine vane wheel 7. Further, a clutch plate 9 is interposed between the input case 4 and the turbine vane wheel 7 and supported by the hub 7a rotatably and axially slidable relative thereto, and defines a fluid chamber 10 in cooperation with the input case 4. The clutch plate 9 is switchable between a clutch decoupling position where the clutch plate 9 is separated from the input case 4 by charging the fluid chamber 10 with pressurized fluid, and a clutch coupling position where the clutch plate is urged toward the input case 4 into frictional engagement therewith by the internal pressure of the internal space 6 as a result of discharge of fluid from (i.e. the reduction of fluid pressure in) the chamber 10. The clutch plate 9 and the turbine vane wheel 7 are connected with each other in a manner to allow rotation relative to each other by way of coil springs 11 extending circumferentially of the clutch plate, whereby upon switching of the clutch plate 9 to the clutch coupling position, the torque is mechanically transmitted through the input shaft 2, the input case 4, the clutch plate 9, the coil springs 11, the turbine vane wheel 7 and the output shaft 3 in the order mentioned.

This torque transmission through the springs 11 now will be described in further detail. As shown in FIG. 2, the coil springs 11, which are plural in number, are accommodated in circumferentially spaced relation within an annular recess 9a formed in an outer periphery of the clutch plate 9. The clutch plate 9 has a support member 12 mounted thereon to support each of the springs 11 from inward movement. Retainers 13 on the torque input side located at both ends of the springs 11 project from the support member 12 to hold each of the springs 11 between them. Also, a retainer 14 on the torque output side, extends from the turbine vane wheel 7 into the space formed between each pair of adjacent springs 11.

Assuming now that the rotating direction i.e. forward rotational direction of the torque converter 1 driven by the engine is in a counterclockwise direction as viewed in FIG. 2, when driving torque is transmitted from the engine, the turbine vane wheel 7 tends to rotate in a clockwise direction relative to that of the clutch plate 9, thereby providing a compressive operation of each springs 11 through the retainer 14 on the output side until the resilient force corresponding to the driving torque is obtained. Thus, the coil springs 11 absorb torque fluctuations in such a manner that the springs 11 each varies its position relative to a predetermined compressed position corresponding to the driving torque.

The coil springs 11 each have a relatively high spring constant so that they will not assume the maximum compressed position with the torque acted thereon in a high driving-torque region, to thereby continue to absorb the torque fluctuations at those high levels. With this high spring constant, however, the springs cannot effectively absorb torque fluctuations in a low driving-torque region, as mentioned above.

Figure 4:
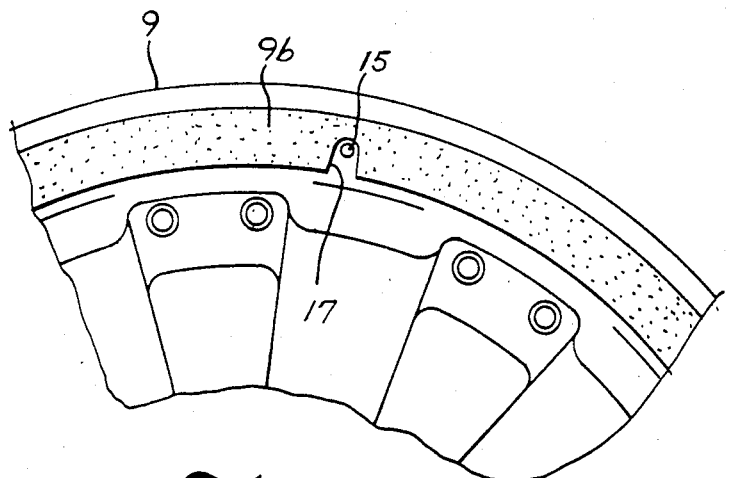
FIG. 4 is a front view of a portion of the clutch plate taken substantially on the line IV—IV in FIG. 1.

According to the invention, the clutch plate 9 is formed with a communication port or hole 15 communicating the internal space 6 with the fluid chamber 10 and disposed to be opened or closed by an on-off fluid flow control member 16. The member 16 is disposed to gradually reduce the opening of the communication hole 15 in accordance with resilient displacement of the springs toward the compressed position, caused by the clockwise rotation of the turbine vane wheel 7 relative to that of the clutch plate 9 as torque increases. As clearly shown in FIGS. 2 and 3, the communication hole 15 is bored through the clutch plate 9 at a location where one of the coil springs 11 is arranged. An annular frictional member 9b on the front surface of the clutch plate 9 is formed with a notch 17 as shown in FIG. 4, so that the internal space 6 can communicate with the fluid chamber 10 through the communication hole 15 and the notch 17. The on-off member 16 is formed of a plate having a substantially L-shaped configuration, as viewed in FIG. 3, which is slidable relative to the clutch plate 9 and mounted together with a washer 11a on the counterclockwise end surface of the springs 11. The member 16 is formed with a wedge-like notch 16a which gradually reduces the opening of the communication hole 15 as the member 16 is moved clockwise.

Figure 5:
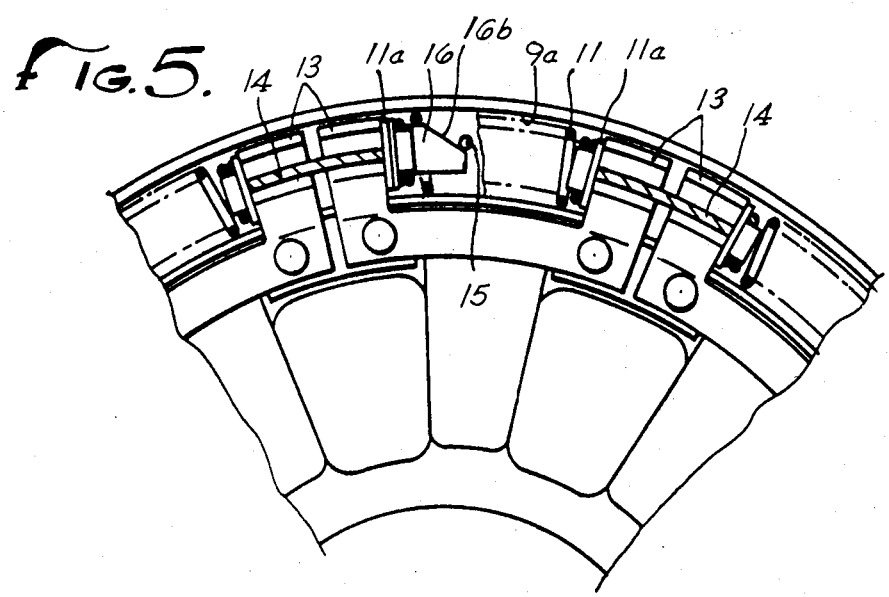
FIG. 5 is a rear sectional view similar to FIG. 2 but illustrating a modified form of a portion of this first embodiment.

The on-off member 16 may be formed with an inclined edge 16b as shown in FIG. 5, which is disposed to gradually reduce the opening of the communication hole 15 rather than the notch shape shown in FIG. 2. Further, the member 16 may be arranged to keep the communication hole 15 open within a predetermined clockwise amount of displacement of the member 16, and close the hole 15 with further displacement of the member 16. Still further, the on-off member 16 may be mounted on the retainer 14 on the output side, or integrally formed with the washer 11a or with the retainer 14. Further, multiple holes 15 and members 16 may be used if desired.

The operation of the device will now be described. As the internal pressure of the internal space 6 increases, the clutch plate 9 is forcibly urged toward the input case 4, providing an increasing torque transmission capacity. In a high driving-torque region, the springs 11 are gradually compressed in the clockwise direction in response to the relative rotation of the turbine vane wheel 7 in the clockwise direction, to have the communication hole 15 gradually closed by the on-off member 16 which moves in unison with the springs 11. Thus, the internal pressure of the internal space 6 can be kept at a predetermined high value, and slipping of the clutch plate 9 is reduced or eliminated in a high driving-torque region, whereby efficient torque transmission is obtained. Since, in this high driving-torque region, torque fluctuations are generally small the springs 11 can completely absorb such fluctuations and vibrations.

In a low driving-torque region, the communication hole 15 is opened due to a reduced resilient displacement of the springs 11, whereby the internal pressure of the internal space 6 is decreased with discharge of fluid from the internal space 6 to the fluid chamber 10, which reduces the torque transmission capacity with a reduction in the driving torque, and allows slipping of the clutch plate 9. In this region, even if the springs 11 do not sufficiently absorb torque fluctuations, such fluctuations can completely be absorbed by the slipping of the clutch plate 9.

Thus, according to the invention, the internal pressure of the internal space can be varied in accordance with driving torque by means of the communication hole formed in the clutch plate and the on-off member which moves in unison with the coil springs, whereby the torque transmission capacity through the clutch plate is varied according to the driving torque, torque fluctuations being absorbed by slipping of the clutch plate in a low driving-torque region, without adversely affecting efficiency of torque transmission in a high driving-torque region. Thus, the disadvantages with the conventional devices can totally be overcome.

Figure 7:
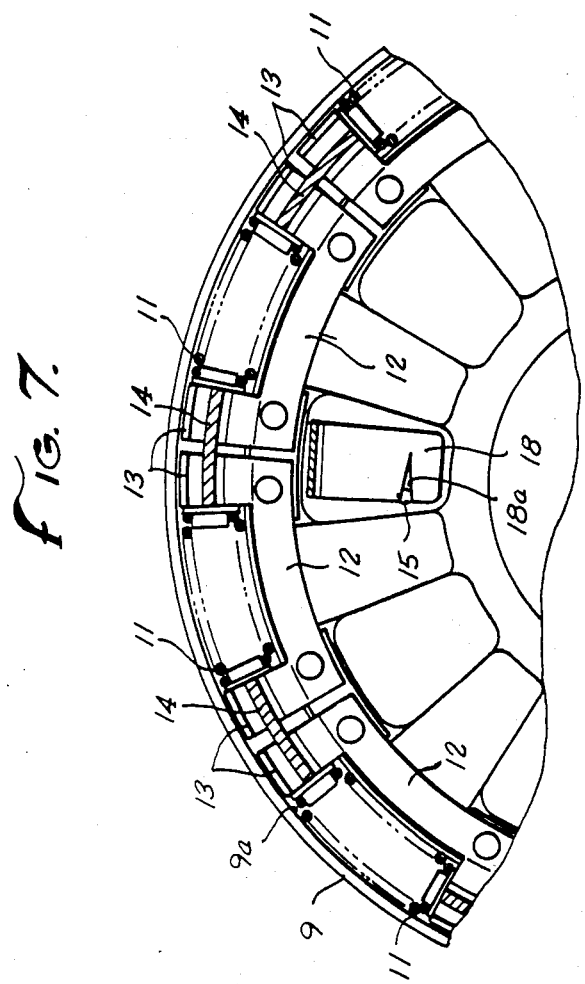
FIG. 7 is a rear sectional view of a portion of the clutch plate of the second embodiment taken substantially on the line VII—VII in FIG. 6.
Figure 6:
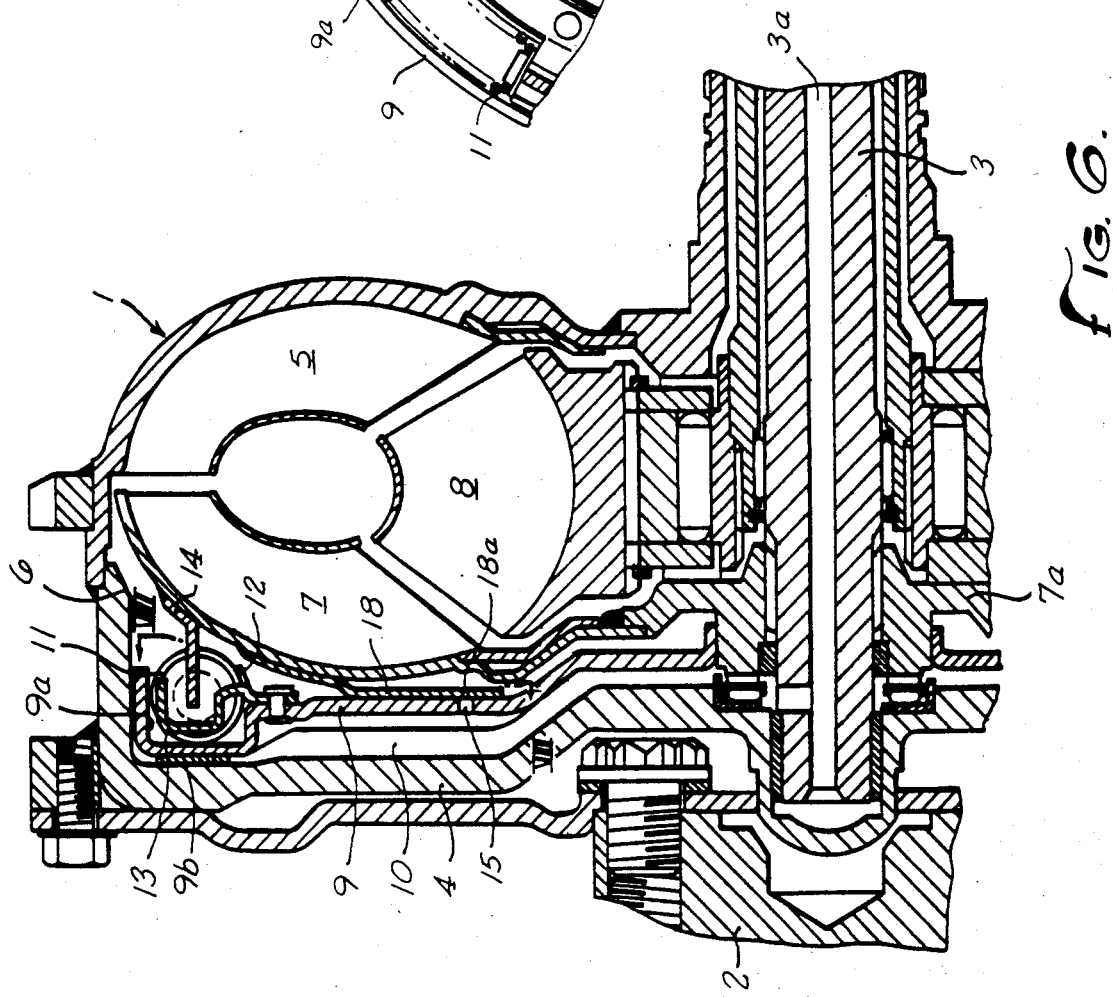
FIG. 6 is a cross-sectional side view similar to FIG. 1 of a torque converter showing a second embodiment of the damper device of this invention.

Referring now to the second embodiment of this invention as shown in FIGS. 6, 7 and 8, certain inconveniences that occur in the first embodiment are overcome, namely, (a) the location of the on-off member 16 at one portion of the spring is structurally awkward, (b) the communication hole 15 is through the location of the frictional member of the clutch plate requiring a notch to insure flow when the clutch is in the coupled condition, and (c) special machining and/or forming of the frictional member. The construction and operation of the torque converter and clutch are the same for this second embodiment as the first embodiment and like numbers designate like elements that are identified o perform the same function whereby the description thereof will not be repeated. However, it should be noted that the elements in this second embodiment are arranged for a drive train in which the normal direction of rotation of the torque converter, as viewed from the rear in FIG. 7, is clockwise rather than counterclockwise as shown in FIG. 2 for the first embodiment.

When driving torque is transmitted from the engine, the clutch plate 9 is rotated in a clockwise direction relative to that of the turbine vane wheel 7, to provide compressive operation of each spring 11 until the resilient force of the spring corresponding to the driving torque is obtained. The amount of relative rotation increases as the magnitude of the driving torque increases. At engine deceleration, the clutch plate 9 rotates in a counterclockwise direction relative to that of the turbine vane wheel 7.

The clutch plate 9 again is provided with a communication hole 15 communicating the front and the rear sides thereof with each other, which is opened or closed by an on-off member 18 in response to relative rotation of the clutch plate 9 and the turbine vane wheel 7. However, here the communication hole 15 is formed in a radially inward portion of the clutch plate 9 rather than at the frictional member 9b. The on-off member 18 is a resilient plate member radially extending to have its axial elastic force, i.e. forwardly urging force, against the clutch plate 9 at its intermediate bending portion bendable backward and forward. The radially outward base portion of the member 18 and the turbine vane wheel 7 are welded together so as for the member 18 to have its radially inward portion urged against the clutch plate 9 by its own resiliency. Further, the radially inward portion of the on-off member 18 is formed with a clockwise tapered notch 18a at a location positionally corresponding to the communication hole 15. In a normal state, the communication hole 15 is located on the counterclockwise side of the notch 18a.

Figure 8A:
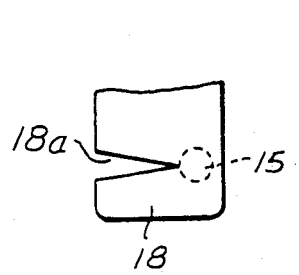
FIGS. 8A, 8B and 8C are enlarged elevation views of the flow control device as shown in FIG. 7 and illustrating three different positions resulting from three levels of torque transmission.
Figure 8B:
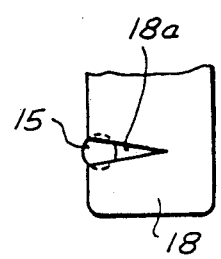

The operation of this second embodiment of the device will now be described. In a high driving-torque region, a substantial clockwise rotation of the clutch plate 9 relative to the turbine vane wheel 7 occurs and accordingly the communication hole 15 is closed by the on-off member 18 at its portion other than the notch 18a, as shown in FIG. 8A, whereby the engaging force of the clutch plate 9 is increased. In this region, torque fluctuations are absorbed by the resilient displacement of the damper springs 11. As the driving torque is reduced, causing a decrease in the amount of clockwise relative rotation of the clutch plate 9, the communication hole 15 becomes positioned opposite the notch 18a, as shown in FIG. 8B, and gradually increases its opening amount, so as to gradually reduce the difference between fluid pressures acting on both sides of the clutch plate 9 with an increase in the amount of fluid leakage to fluid chamber 10 and out through axial bore 3a, whereby the engaging force of the clutch plate 9 is reduced in accordance with a reduction in the driving torque. In this region, torque fluctuations are efficiently absorbed by the slipping of the clutch plate 9.

Figure 8C:
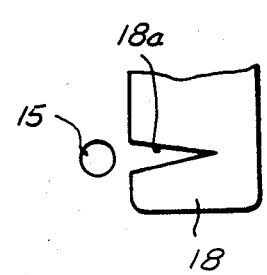

At engine deceleration, the communication hole 15 is separated from the on-off member 18 to be fully opened as shown in FIG. 8C, due to counterclockwise relative rotation of the clutch plate, whereby the clutch plate 9 is disengaged from the input case 4. Large torque fluctuations produced at the initial stage of engine deceleration are absorbed by fluid torque transmission.

The present device is not limited to the embodiments described above. For instance, the notch 18a may be omitted so as for the communication hole 15 to be opened only at engine deceleration. Further, if the communication hole 15 is provided in the clutch plate 9 in the vicinity of the hub 7a of the turbine vane wheel 7, the on-off member 18 may be secured to the hub 7a.

According to the arrangement of the first embodiment, the communication hole 15 is provided in the outer periphery of the clutch plate, which forms the engaging surface 9b for engagement with the input case 4. Therefore, the frictional member 9b has to be configurated and located so as not to close the communication hole 15. In contrast to the first embodiment, in this second embodiment the communication hole 15 is not closed by the frictional member 9b. Consequently, the frictional member 9b even can be positioned on the input case 4, and no notch needs to be formed in the frictional member 9b. Further, since the on-off member 18 can be arranged in a manner independent or separate from the damper springs 11, the structure involving the retainers 13 and 14 for the damper springs 11 can be simplified. Still further, the on-off member 18 is secured to the turbine vane wheel 7 before assembly whereby the clutch plate 9 and the turbine vane wheel 7 can be assembled easily with the on-off member 18 automatically urged against the clutch plate 9 with its own resiliency.

Referring now to the third embodiment of the invention illustrated in FIGS. 9 through 12, certain deficiencies and limitations of the first and second embodiments are overcome, namely, the ability to select the conditions for opening and closing the fluid communication port or hole 15 is restricted to the relative movement that occurs upon compression of the springs 11 and is only in direct relation to such compression. Again, the basic elements of the torque converter and clutch are the same, function in the same way, are identified by like numerals, and will not be described again.

Figure 10:
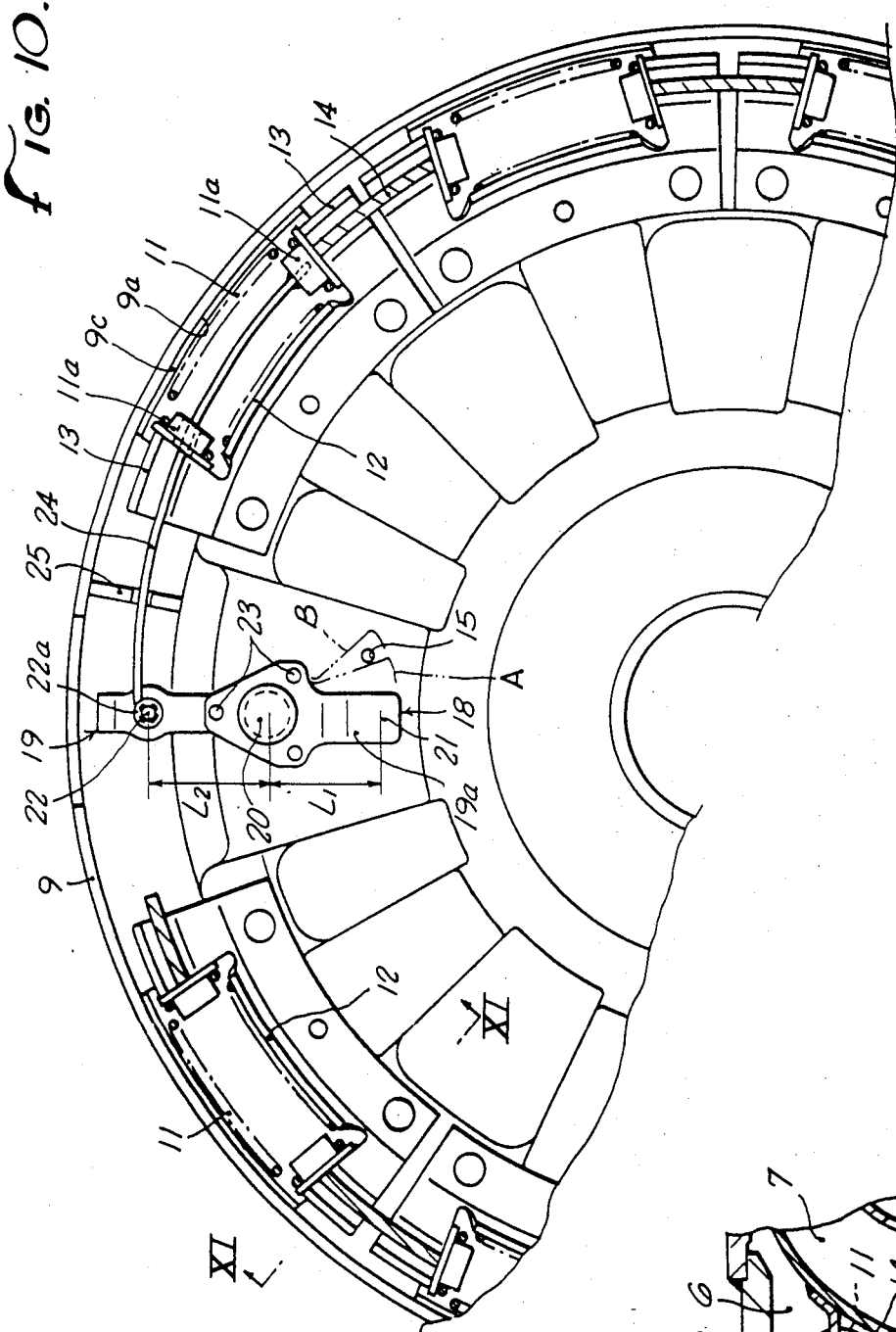
FIG. 10 is a rear sectional view taken substantially on the line X—X in FIG. 9 illustrating the third embodiment.
Figure 11:
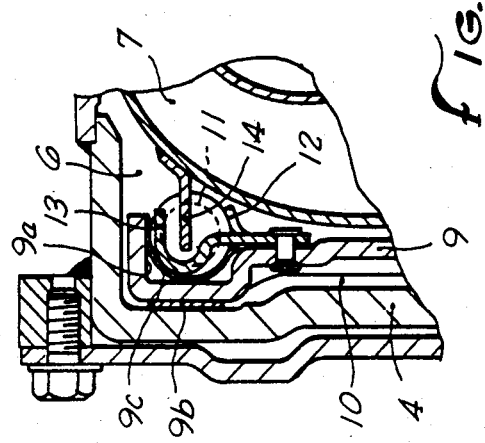
FIG. 11 is a sectional side view of a portion of the clutch plate of the third embodiment taken substantially on the line XI—XI in FIG. 10.

As shown in FIGS. 10 and 11, the damper springs 11 again comprise coil springs which are accommodated in circumferentially spaced relation within an annular recess 9a formed in an outer periphery on the rear side surface of the clutch plate 9. The clutch plate 9 has a support member 12 mounted thereon to support each of the springs 11 from inward movement. Retainers 13 on the torque input side project from the support member 12 to hold each of the springs 11 therebetween by way of spring washers 11a arranged at both ends of the springs 11. Retainers 14 on the torque output side, extending from the turbine vane wheel 7, are each inserted into a space formed between each pair of adjacent springs 11. In the drawings, reference numeral 9c designates a guide plate arranged in the recess 9a for smooth resilient displacement of the springs 11.

Assuming now that the rotating direction i.e. forward rotational direction of the torque converter 1 driven by the engine is in the clockwise direction as viewed in FIG. 10, when driving torque is transmitted from the engine, the turbine vane wheel 7 is rotated in an opposite direction i.e. in the counterclockwise direction relative to that of the clutch plate 9. Each of the springs 11 is compressed through the retainer 14 on the output side until the resilient force of the spring corresponding to the driving torque is obtained. Thus, an amount of rotation of the turbine vane wheel 7 relative to the clutch plate 9 in the counterclockwise direction is increased with an increase in the driving-torque.

Figure 9:
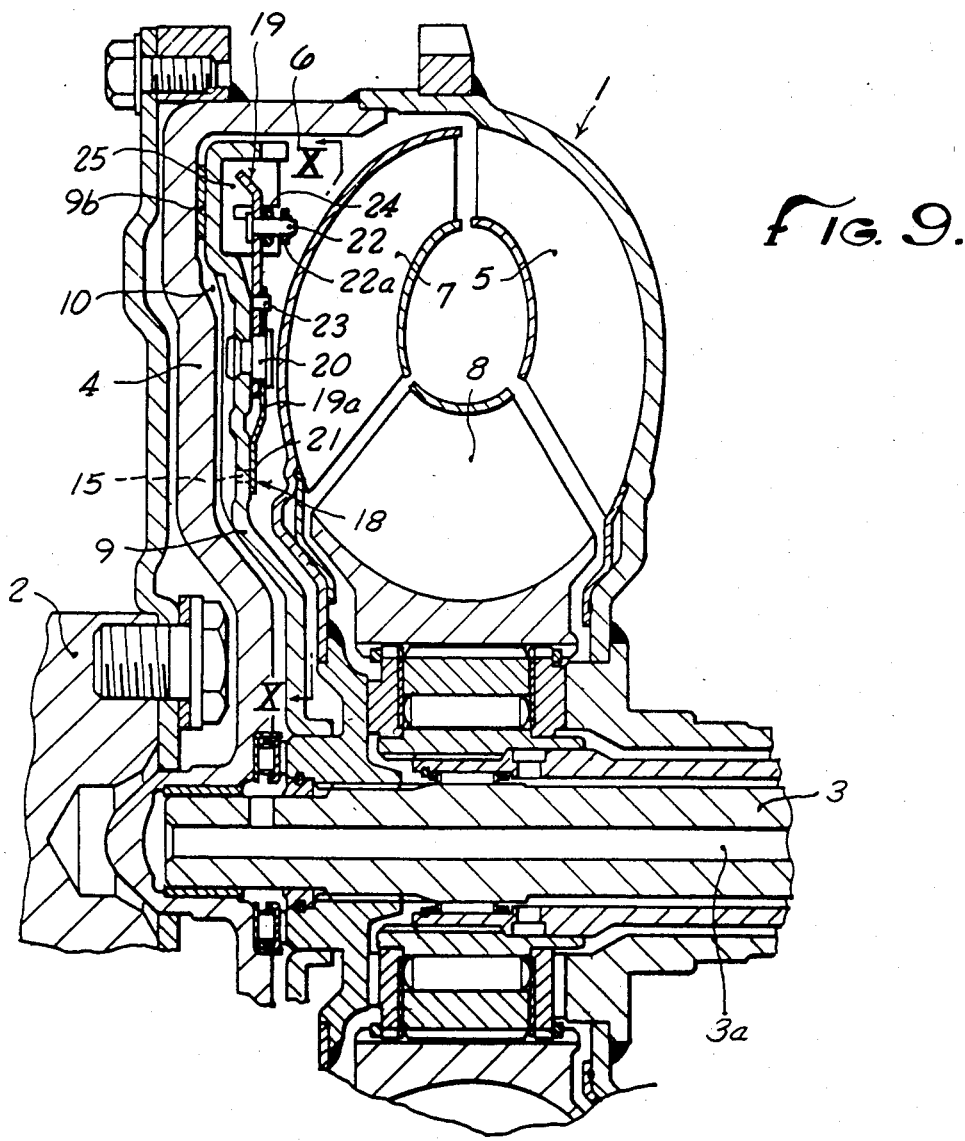
FIG. 9 is a cross-sectional side view similar to FIGS. 1 and 6 of a torque converter showing a third embodiment of the damper device of this invention.

As shown in FIGS. 9 and 10, the clutch plate 9 again is formed with a communication hole 15 communicating between both or opposite sides thereof, and also provided with an on-off valve 18 which is disposed to open or close the communication hole 15, wherein the on-off valve 18 is forced to move so as to close the communication hole 15 by relative rotation of the turbine vane wheel 7 in an opposite direction i.e. in the counterclockwise direction relative to that of the clutch plate 9. In a small or low driving torque region where the amount of the relative rotation of the turbine vane wheel 7 is small, the communication hole 15 is opened so as to reduce the difference between fluid pressures acted on both sides of the clutch plate 9 with leakage of fluid through the communication hole 15. Thus, the engaging force of the clutch plate 9 with the input case 4 is decreased, permitting torque fluctuations to be efficiently absorbed by the slipping of the clutch plate 9 in this region.

The arrangement of the third embodiment described so far does not substantially differ from the previous embodiments. However, in this third embodiment, the on-off valve 18 comprises a swing member 19 pivoted on the clutch plate 9. The swing member 19 is formed with a valve portion 21 located at such a suitable distance from its pivot 20 as to open or close the communication hole 15, and with a connecting portion 22 connected to the turbine vane wheel 7 and disposed to cause the swing member 19 to swing in response to the relative rotation of the turbine vane wheel 7 with respect to the clutch plate 9 in the opposite direction i.e. in the counterclockwise direction.

In the illustrated embodiment, the swing member 19 is formed of a plate extending radially outwardly from the pivot 20, to which a resilient plate 19a having a suitable length is fastened with rivets 23 and extends radially inwardly. The resilient plate 19a has its inner end portion disposed in resiliently engaging contact with the clutch plate 9 so as to function as the valve portion 21, whereby sufficient sealability between the valve portion 21 and the communication hole 15 is obtained.

The connecting portion 22 comprises a pin mounted on the swing member 19 at a suitable outward portion of same and arranged on the counterclockwise side of one of the damper springs 11. A piano wire 24 serves as a connecting rod with one end secured to a spring washer 11a on the clockwise side of the adjacent springs 11 and extends counterclockwise from same, wherein the spring washer 11a is forced into contact with an associated output side retainer 14 formed on the turbine vane wheel 7 by the counterclockwise relative rotation of the turbine vane wheel 7. The other end of the connecting rod 24 is connected to the connecting portion 22.

The piano wire 24 extends through another spring washer 11a, on the counterclockwise side of the spring 11, and also through a guide member 25, so as to be guided by them in a circumferentially movable manner. The other end of the piano wire 24 is wound onto the aforementioned pin forming the connecting portion 22, in an axially movable manner. Thus, the swing member 19 is kept free from the influence of movement of the spring 11 or the washer 11a away from the clutch plate 9. In the drawings, reference numeral 22a designates a retainer member provided at the connecting portion 22 to prevent disengagement of the piano wire 24 from the pin.

The operation of this third embodiment will now be described. When the clutch plate 9 is in its engaging position, the turbine vane wheel 7 is rotated relative to the clutch plate 9 in the counterclockwise direction in response to the driving torque, whereby the connecting portion 22 of the swing member 19 is urgedly moved in the counterclockwise direction through the torque output side retainer 14, the spring washer 11a and the piano wire 24 by an amount corresponding to the amount of relative rotation of the turbine vane wheel 7, as described above. Consequently, the connecting portion 22 swings in the counterclockwise direction about the pivot 20 of the swing member 19 as the center thereof, so as to produce a swinging movement of the valve portion 21 in the direction closing the communication hole 15. The relationship between the amount of relative rotation of the turbine vane wheel 7 i.e. the magnitude of the driving torque and the amount of displacement of the valve portion 21 is determined by the ratio between the distance $L_1$, between the pivot 20 and the valve portion 21 and the distance $L_2$ between the pivot 20 and the connecting portion 22, that is, the ratio $L_1/L_2$. When the relationship $L_1/L_2 > 1$ is satisfied, the amount of displacement of the valve portion 21 becomes larger than the amount of relative rotation of the turbine vane wheel 7, whereby the opening of the communication hole 15 is controlled so that the valve portion 21 can move from a position A in FIG. 10, where the valve portion 21 begins to close the communication hole 15, to a fully closing position B within a limited small driving torque region, permitting fine adjustment of the engaging force of the clutch plate 9 in this region. When the relationship $L_1/L_2 < 1$ is satisfied, the amount of displacement of the valve portion 21 becomes smaller than the amount of relative rotation of the turbine vane wheel 7, whereby the opening of the communication hole 15 can be controlled over a wider region i.e. from an intermediate driving torque region to a large driving torque region, permitting adjustment of the engaging force of the clutch plate 9 over a wider region in accordance with the driving torque.

Figure 12:
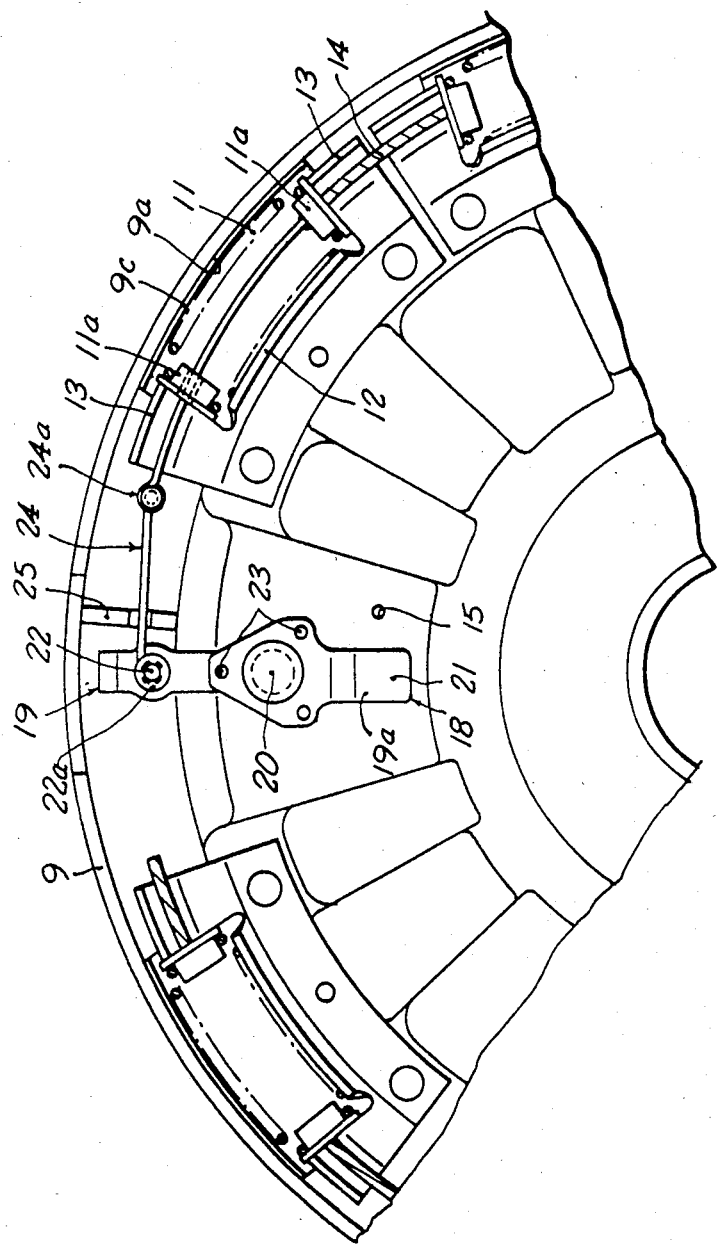
FIG. 12 is a rear sectional view similar to FIG. 10 illustrating a modification of the third embodiment of this invention.

The swing member 19 is disposed to swing eccentrically with the axis of the fluid torque converter, therefore with swinging movement of the swing member 19, the connecting portion 22 varies in radial position with respect to the clutch plate 9 and the turbine vane wheel 7. As the amount of relative rotation of the turbine vane wheel 7 increases, the connecting portion 22 is radially inwardly moved in a manner increasing the curvature of the piano wire 24. Therefore, as shown in FIG. 12, a joint 24a may be provided at an intermediate portion of the piano wire 24 so as to prevent such curvature and resilient stress from being produced.

Although, in the illustrated embodiments, the piano wire 24 is secured to the spring washer 11a, this is not limitative. For instance, the piano wire 24 may be secured to the retainer 14 on the output side. Further, the piano wire 24 may be replaced by a pin provided on one arm portion of the swing member 19 and the turbine vane wheel 7, and a radial slit formed in the other arm portion of the swing member 19 and the turbine vane wheel 7, so as to engage with each other at the connecting portion 22.

Thus, according to this third embodiment of the device, the distance between the pivot and the valve portion which is formed in the swing member forming the on-off valve and between the pivot and connecting portion connected to the turbine vane wheel are set at suitable values, whereby the opening of the communication hole can be controlled in any desired driving torque region, permitting precise selection of the engaging force of the clutch plate in response to the driving torque.

Although I have fully described my invention in connection with specific embodiments thereof, it is to be understood that my invention is not limited to those embodiments but rather is of the full scope of the appended claims.

What is claimed:

1. A damper device for a torque converter clutch with a clutch plate for coupling an input case on an input shaft to a turbine vane wheel on an output shaft in which higher fluid pressure differential across the clutch plate causes coupling and lower fluid pressure differential allows slipping wherein the clutch plate is connected to the turbine vane wheel by circumferentially extending springs to allow limited springbiased relative rotation therebetween, the improvement comprising; a fluid communication hole in the clutch plate, a flow control means positioned in association with said hole for opening or closing said hole and having means connected to the turbine vane wheel for tending to close said hole upon relative rotation between the clutch plate and turbine vane wheel caused by higher levels of torque transmission through the springs and tending to open said hole upon lower levels of torque, said flow control means being operated for tending to close the hole upon transmission of torque from said clutch plate to the turbine vane wheel directly through said circumferentially extending springs by the torque tending to compress said springs.

2. The device of claim 1 wherein said flow control means includes a plate element in resilient surface contact with the clutch plate at the location of said communication hole and said plate element is movable between positions exposing and covering said hole.

3. The device of claim 2 wherein said plate element includes an edge portion inclined to the direction of movement of the plate element for progressively exposing and covering said hole during said movement.

4. The device of claim 3 wherein a notch is formed in said plate element extending in the direction of said movement and said inclined edge is included in said notch.

5. The device of claim 2 wherein said plate element is mounted on the turbine vane wheel.

6. The device of claim 2 wherein said plate element is pivotally mounted on said clutch plate.

7. A damper device for a torque converter clutch with a clutch plate for coupling an input case on an input shaft to a turbine vane wheel on an output shaft in which higher fluid pressure differential across the clutch plate causes coupling and lower fluid pressure differential allows slipping wherein the clutch plate is connected to the turbine vane wheel by circumferentially extending spring to allow limited spring-biased relative rotation therebetween, the improvement comprising; a fluid communication hole in the clutch plate, a flow control means positioned in association with said hole for opening or closing said hole and having means connected to the turbine vane wheel for tending to close said hole upon relative rotation between the clutch plate and turbine vane wheel caused by higher levels of torque transmission through the springs and tending to open said hole upon lower levels of torque, said flow control means including a plate element pivotally mounted on and in resilient surface contact with the clutch plate at the location of said communication hole, said plate element being movable between positions exposing and covering said hole, said plate element being moved toward the position for covering the hole upon transmission of torque from said clutch to the turbine vane wheel directly through said circumferentially extending springs by the torque tending to compress said springs, and said plate element having equal arm portions extending from said pivotal mounting with one arm portion connected to said means connected to the turbine vane wheel and the other arm portion being the portion in resilient surface contact with the clutch plate.

8. The device of claim 7 wherein said connecting means includes a rod connected to one portion of said plate element for causing pivoting upon changes in torque being transmitted.

9. A damper device for a torque converter clutch with a plate for coupling an input case on an input shaft to a turbine vane wheel on a output shaft in which higher fluid pressure differential across the clutch plate causes coupling and lower fluid pressure differential allows slipping wherein the clutch plate is connected to the turbine vane wheel by circumferentially extending springs to allow limited spring-biased relative rotation therebetween and an annular frictional member accomplishes the engagement between the clutch plate and input case, the improvement comprising; a fluid communication hole in the clutch plate spaced radially inwardly from the frictional member, and flow control means positioned in association with said hole for opening or closing said hole to fluid flow to reduce or increase, respectively, the pressure differential across the clutch plate and having means connected to the turbine vane wheel for tending to close said hole upon relative rotation between the clutch plate and turbine vane wheel caused by higher levels of torque transmission through the springs and tending to open said hole upon lower levels of torque, said flow control means being operated for tending to close the hole upon transmission of torque from said clutch plate to the turbine vane wheel directly through said circumferentially extending springs by the torque tending to compress said springs.

10. A damper device for the clutch of a torque converter comprising, an input case having a pump vane wheel, a turbine vane wheel mounted on an output shaft and positioned within the input case to be fluidly driven thereby, a clutch plate for coupling the input case to the turbine vane wheel and having means for higher fluid pressure differential across the clutch plate to cause coupling and lower fluid pressure differential to allow slipping therebetween, said clutch plate having circumferentially extending springs with means connected to the turbine vane wheel to allow limited spring-biased relative rotation therebetween, a fluid communication hole in the clutch plate, and a flow control means positioned in association with each said hole for opening or closing said hole to fluid flow to reduce or increase, respectively, the pressure differential across the clutch plate and having means connected to the turbine vane wheel for tending to close said hole upon relative rotation between the clutch plate and turbine vane wheel caused by higher levels of torque transmission through the springs and tending to open said hole upon lower levels of torque, said flow control means being operated for tending to close the hole upon transmission of torque from said clutch plate to the turbine vane wheel directly through said circumferentially extending springs by the torque tending to compress said springs.

* * * * *